(12) United States Patent
Iwaya et al.

(10) Patent No.: US 9,441,579 B2
(45) Date of Patent: Sep. 13, 2016

(54) FUEL TANK SYSTEM

(71) Applicant: MITSUBISHI JIDOSHA KOGYO KABUSHIKI KAISHA, Tokyo (JP)

(72) Inventors: Norifumi Iwaya, Okazaki (JP); Atsushi Wakamatsu, Okazaki (JP); Takayuki Sano, Okazaki (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 108 days.

(21) Appl. No.: 14/470,327

(22) Filed: Aug. 27, 2014

(65) Prior Publication Data

US 2015/0059890 A1 Mar. 5, 2015

(30) Foreign Application Priority Data

Aug. 28, 2013 (JP) .................... 2013-176691

(51) Int. Cl.
*F02M 25/08* (2006.01)
*F16K 24/04* (2006.01)
*B60K 15/035* (2006.01)
*F02D 41/00* (2006.01)
*F02M 37/00* (2006.01)

(52) U.S. Cl.
CPC .... *F02M 25/0836* (2013.01); *B60K 15/03519* (2013.01); *F02M 25/089* (2013.01); *F02M 25/0809* (2013.01); *F02M 37/0076* (2013.01); *F16K 24/04* (2013.01); *F02D 41/004* (2013.01); *F02M 2025/0845* (2013.01); *Y10T 137/8326* (2015.04)

(58) Field of Classification Search
CPC ................ F02M 25/0836; F02M 2025/0845; B60K 15/03519; F02D 41/004; F16K 24/04
See application file for complete search history.

(56) References Cited

U.S. PATENT DOCUMENTS

| 4,838,323 | A | * | 6/1989 | Watts | ..................... B67D 7/342 141/1 |
| 2002/0182878 | A1 | * | 12/2002 | Hirose | .............. H01J 37/32449 438/710 |
| 2014/0352796 | A1 | * | 12/2014 | Dudar | .................. B60K 15/035 137/15.01 |

FOREIGN PATENT DOCUMENTS

| JP | 2001-193580 A | 7/2001 |
| JP | 2002-004958 A | 1/2002 |
| JP | 2004-156496 A | 6/2004 |
| JP | 2005-030334 A | 2/2005 |
| JP | 2008-203086 A | 9/2008 |
| JP | 2009-021359 A | 1/2009 |
| JP | 2009-303218 A | 12/2009 |
| JP | 2010-120535 A | 6/2010 |
| JP | 2012-092685 A | 5/2012 |

* cited by examiner

*Primary Examiner* — Atif Chaudry
(74) *Attorney, Agent, or Firm* — Birch, Stewart, Kolasch & Birch, LLP

(57) ABSTRACT

A first pressure sensor that detects pressure in a narrow pressure range with high accuracy is provided in a fuel tank, and a second pressure sensor that detects pressure in a wide pressure range with low accuracy with respect to the first pressure sensor is provided in vapor piping between the fuel tank and a tank blocking valve. Until internal pressure of the fuel tank becomes a second predetermined pressure, meter indication is performed on a display on the basis of a second tank internal pressure P2 calculated by the second pressure sensor and an atmospheric pressure sensor, and when internal pressure of the fuel tank becomes less than the second predetermined pressure, the meter indication is performed on the display on the basis of a first tank internal pressure P1 obtained by the first pressure sensor until internal pressure of the fuel tank becomes a fifth predetermined pressure.

8 Claims, 6 Drawing Sheets

Status 0

Status 1

Status 2

Status 3

Status 4

Status 5

REFUEL READY

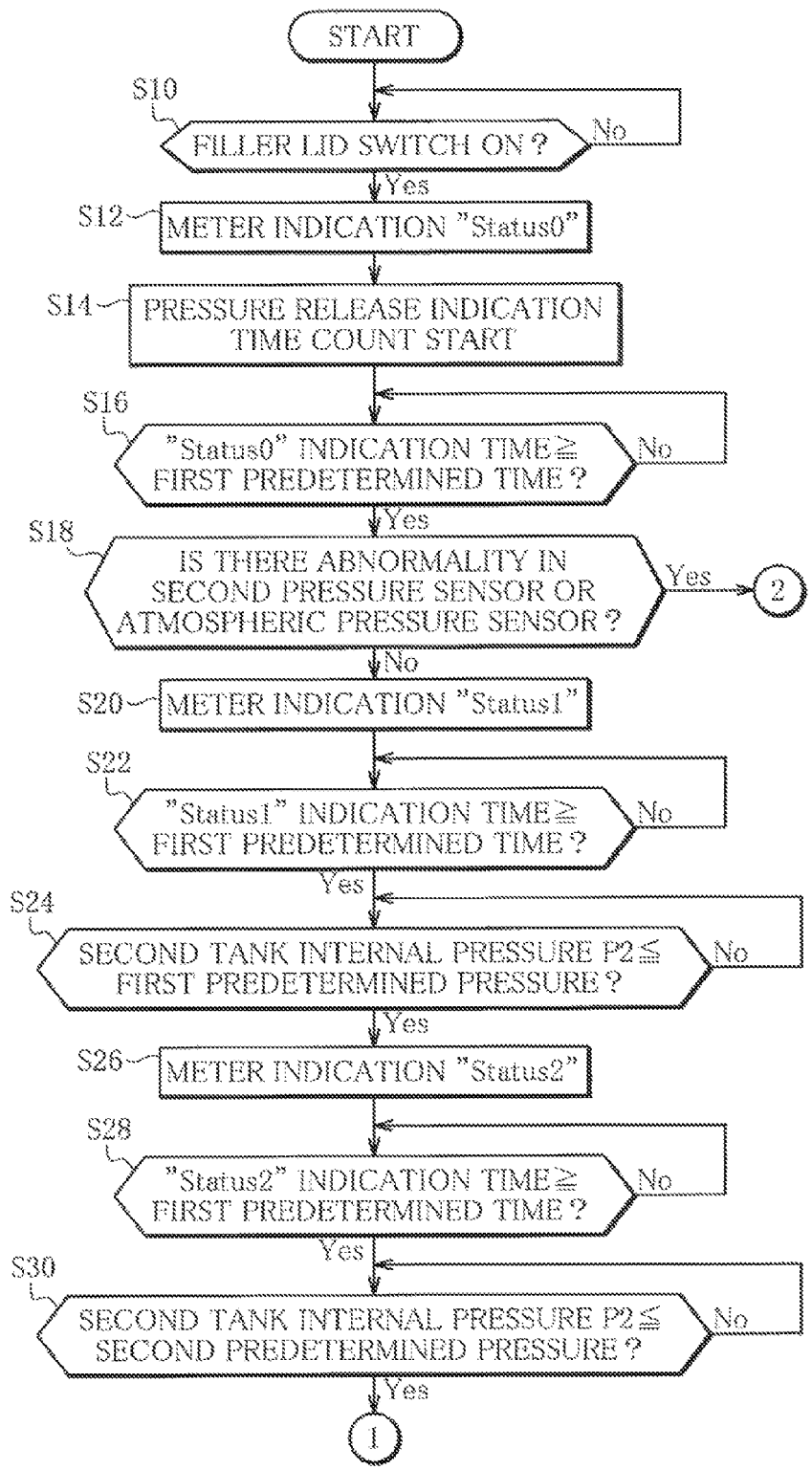

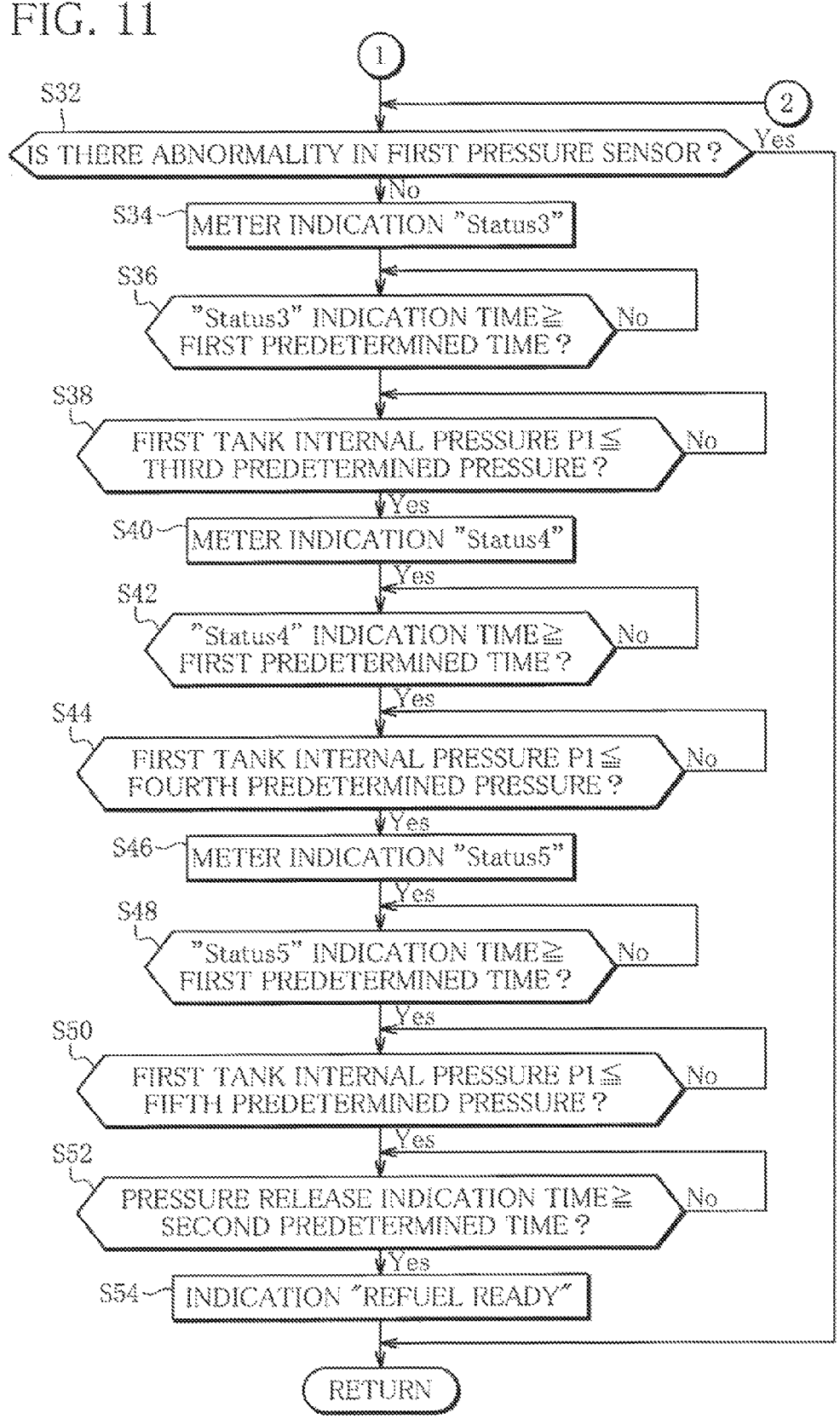

FUEL TANK SYSTEM

BACKGROUND OF THE INVENTION

1. Field of the Invention

The present invention relates to a fuel tank system, and more particularly to operation control of a display device in a closed type fuel tank until a filler lid is opened.

2. Description of the Related Art

In a conventional fuel tank system, there is a technique for preventing release of a fuel evaporative emission formed by evaporation in a fuel tank into the atmosphere, in which a sealing valve (hereinafter referred to as a tank blocking valve), which is controlled so as to close the fuel tank, is provided in a path allowing the fuel tank to communicate with a canister. The tank blocking valve is opened at the time of filling so that the fuel evaporative emission is allowed to flow to the canister, thereby allowing the canister to absorb the fuel evaporative emission.

In such a fuel tank system, if the fuel tank is closed by the tank blocking valve, fuel in the fuel tank evaporates with a rise in outside air temperature, so that pressure in the fuel tank, or fuel tank internal pressure, may become high due to a fuel evaporative emission. In addition, if a lid of a fill opening of the fuel tank is opened for filling and the like in a state where the fuel tank internal pressure is high, there is a possibility of release of the fuel evaporative emission in the fuel tank into the atmosphere.

Thus, in order to prevent release of a fuel evaporative emission into the atmosphere at the time of filling, if a driver performs an operation of opening a filler lid, the operation is detected, and a sealing valve is opened before the filler lid is opened so that the fuel evaporative emission is allowed to flow to a canister to release pressure in the fuel tank in advance, thereby sufficiently reducing the fuel tank internal pressure before opening the filler lid.

Unfortunately, if the fuel tank internal pressure is high, it takes time to release the pressure in the fuel tank. As a result, it takes time until a filler lid is opened after a driver performs an opening operation with a lid switch, thereby giving discomfort to the driver.

Japanese Patent Laid-Open No. 2010-120535, for example, describes a fuel tank system in which pressure release time, which is the time until the fuel tank internal pressure becomes equivalent to atmospheric pressure, is calculated from the fuel tank internal pressure at the time of closing an opening/closing valve (hereinafter referred to as a tank blocking valve), and the pressure release time is indicated on a display device to notify a driver, thereby reducing discomfort given to the driver.

In this fuel tank system, the fuel tank internal pressure during closure of the tank blocking valve is detected by a pressure sensor, and the pressure release time is calculated on the basis of the fuel tank internal pressure detected by the pressure sensor, thereby indicating the pressure release time.

However, fuel always evaporates in the fuel tank and an evaporation amount of the fuel varies depending on temperature of the fuel. Thus, in a case where fuel has a high temperature and there is a large evaporation amount of the fuel, for example, even if indication on the display device reaches the pressure release time, the fuel tank internal pressure does not become equivalent to the atmospheric pressure due to a large evaporation amount, and the filler lid is not opened. As a result, there is a possibility of giving discomfort to a driver, and this is not preferable.

SUMMARY OF THE INVENTION

The present invention has been made to solve the problem described above, and an object of the present invention is to provide a fuel tank system capable of accurately indicating a period of time until a filler lid is opened.

In order to achieve the object above, the invention of the present application is a fuel tank system that comprises: a fuel tank mounted on a vehicle; a canister that absorbs a fuel evaporative emission discharged from the fuel tank; piping that connects the canister and the fuel tank; a blocking valve that is provided in the piping to block the fuel tank; a filling starting part that instructs a start of filling to the fuel tank; a first pressure detector that is arranged in the fuel tank to detect pressure in the fuel tank; a second pressure detector that detects the pressure in the fuel tank with an accuracy different from the accuracy of the first pressure detector; a pressure reduction control part that reduces the pressure in the fuel tank to a predetermined pressure by opening the blocking valve when a start of filling is instructed by the filling starting part; a filling permission part that permits filling when the pressure in the fuel tank becomes the predetermined pressure or less with the pressure reduction control part; and an indication part that indicates a progress degree of reduction of the pressure in the fuel tank during a period from the instruction of the start of filling to the permission of filling on the basis of a detection result obtained by the first pressure detector or the second pressure detector.

Accordingly, when a fill opening of a fuel tank is opened for filling a vehicle and the like, a progress degree of reduction of the pressure in the fuel tank during a period from the instruction of the start of filling to the permission of filling is indicated on the basis of a detection result obtained by the first pressure detector or the second pressure detector, each of which has a different accuracy. As a result, it is possible to accurately notify a driver of a progress degree of reduction of the pressure in the fuel tank by combining the two detectors to prevent discomfort from being given to the driver.

BRIEF DESCRIPTION OF THE DRAWINGS

The present invention will become more fully understood from the detailed description given hereinafter and the accompanying drawings which are given by way of illustration only, and thus, are not limitative of the present invention, and wherein:

FIG. 10 is a part of a flow chart of meter indication control of a fuel tank system in accordance with the present invention; and FIG. 11 is the remainder of the flow chart of the meter indication control of a fuel tank system in accordance with the present invention.

DETAILED DESCRIPTION OF THE PREFERRED EMBODIMENT

The fuel tank system of the present invention will be described on the basis of the accompanying drawings.

Figure 1:
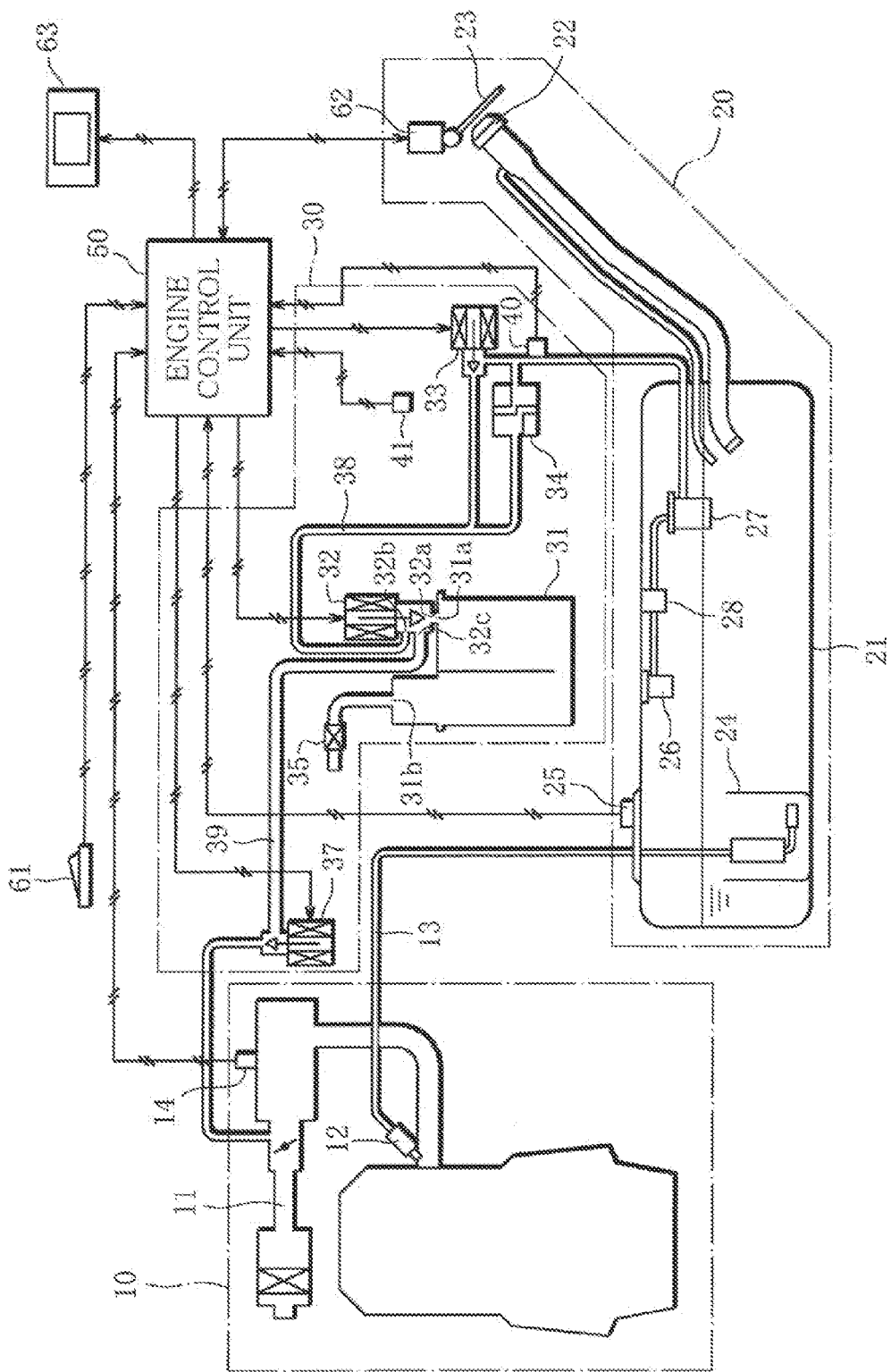
FIG. 1 is a schematic configuration diagram of a fuel tank system in accordance with the present invention.
Figure 2:
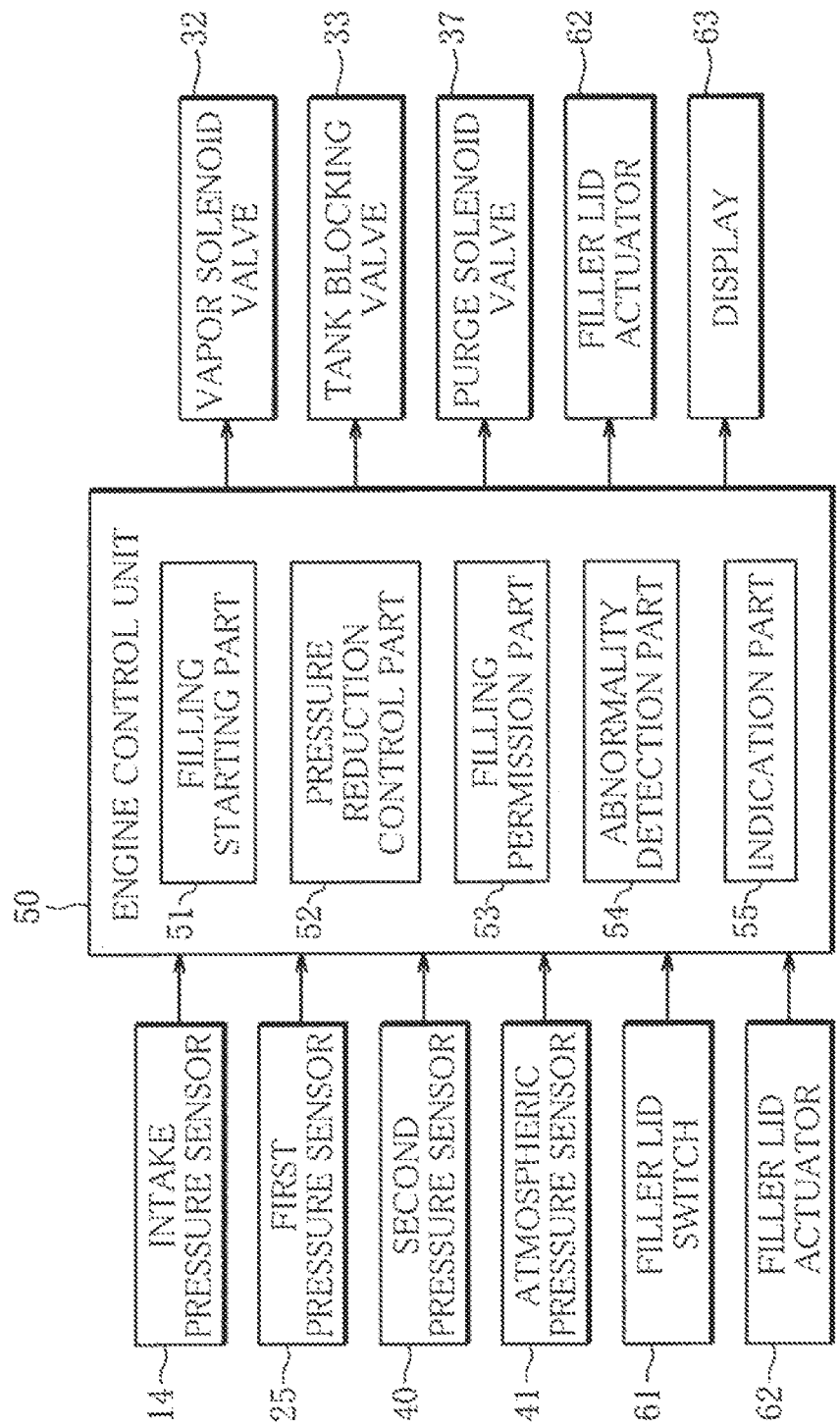
FIG. 2 is a block diagram of a fuel tank system in accordance with the present invention.

FIG. 1 is a schematic configuration diagram of a fuel tank system in accordance with the present invention. FIG. 2 is a block diagram of a fuel tank system in accordance with the present invention. In addition, FIGS. 3 to 9 show indication contents at respective indication states of a meter indicated on a display. FIGS. 3 to 9 each show a progress degree of pressure release in a fuel tank 21 from a start of releasing internal pressure of the fuel tank 21 to a finish thereof, namely show a stepwise progress degree of reduction of pressure in the fuel tank 21. Hereinafter, a configuration of a fuel tank system in accordance with the present invention will be described.

As shown in FIG. 1, a fuel tank system in accordance with the present invention comprises: an engine 10 largely mounted on a vehicle; a fuel containing unit 20 that contains fuel; a fuel evaporative emission treatment unit 30 that treats a fuel evaporative emission which is an evaporative emission of the fuel formed by evaporation in the fuel containing unit 20; an engine control unit (corresponding to the second pressure detector, the filling starting part, the pressure reduction control part, the filling permission part, an abnormality detection part, and the indication part, of the present invention) 50, which is a control device for performing overall control of the vehicle, and includes an input-output device, a storage device (ROM, RAM, nonvolatile RAM, and the like), a central processing unit (CPU), and the like; a momentary filler lid switch (corresponding to the filling starting part of the present invention) 61 and a filler lid actuator 62, which operate an opening operation of a filler lid 23 of the vehicle; and a display (corresponding to the indication part and the display of the present invention) 63 that indicates a state of the vehicle and the like.

The engine 10 is a four-cycle in-line four-cylinder type gasoline engine of an air intake passage injection type (Multi Point Injection: MPI). The engine 10 is provided with an air intake passage 11 for taking air into a combustion chamber of the engine 10, and the air intake passage 11 is provided with an intake pressure sensor 14 for detecting internal pressure of the air intake passage 11. In addition, the air intake passage 11 is provided in its downstream with a fuel injection valve 12 for injecting fuel into an intake port of the engine 10. A fuel piping 13 is connected to the fuel injection valve 12 so that the fuel is supplied. The engine 10 is not limited to an air intake passage injection type, but may be an in-cylinder injection type, for example.

The fuel containing unit 20 includes: a fuel tank 21 for containing fuel; a filling opening 22 which is a fuel inlet to the fuel tank 21; the filler lid 23; a fuel pump 24 for supplying the fuel to the fuel injection valve 12 from the fuel tank 21 through the fuel piping 13; a first pressure sensor (first pressure detector) 25; a fuel cutoff valve 26 that is provided in its inside with a float valve that is not shown, and that prevents the fuel from flowing to the fuel evaporative emission treatment unit 30 from the fuel tank 21 by using an operation of the float valve; a leveling valve 27 for controlling a liquid level in the fuel tank 21 at the time of filling; a two-way valve 28 that is provided with an orifice ($\phi$1.0 mm, for example) with an inner diameter smaller than an inner diameter of the piping such as a vapor piping 38 and a purge piping 39, which will be described later, and that restricts the filling in a state where the fuel tank 21 is filled up with fuel, or restricts the amount of fuel to be refilled; and a fuel amount detector for detecting a fuel amount in the fuel tank 21, which is not shown. In addition, a fuel evaporative emission occurring in the fuel tank 21 is discharged from a lower portion of the leveling valve 27 to the outside of the fuel tank 21, or from the fuel cutoff valve 26 to the outside of the fuel tank 21 through the two-way valve 28 and the leveling valve 27.

The filler lid 23 is a lid of the filling opening 22 provided on a vehicle body of the vehicle.

The first pressure sensor 25 has a property capable of detecting pressure in a narrow pressure range with a high accuracy (a measurement range of ±10 kPa, and a measurement accuracy of ±0.1 kPa, for example), by which the pressure near the atmospheric pressure can be accurately detected. The first pressure sensor 25 should have resolution capable of satisfying determination in steps S38, S44, and S50 in meter indication control that will be described later. The first pressure sensor 25 is arranged in the fuel tank 21 to directly detect a pressure difference between an absolute internal pressure of the fuel tank 21 and the atmospheric pressure, that is, a first tank internal pressure P1 which is a gauge pressure of the internal pressure of the fuel tank 21.

The fuel evaporative emission treatment unit 30 comprises: a canister 31; a vapor solenoid valve 32; a tank blocking valve (blocking valve) 33; a safety valve 34; an air filter 35; a purge solenoid valve 37; vapor piping (piping) 38; purge piping 39; a second pressure sensor (corresponding to the second pressure detector of the present invention) 40; and an atmospheric pressure sensor (corresponding to the second pressure detector of the present invention) 41.

The canister 31 is provided in its inside with activated carbon. In addition, the canister 31 is provided with an evaporative emission circulation hole 31a in which a fuel evaporative emission occurring in the fuel tank 21 or a fuel evaporative emission absorbed in the activated carbon circulates. Further, the canister 31 is provided with an outside air suction hole 31b through which outside air is sucked when the fuel evaporative emission absorbed in the activated carbon is discharged. The outside air suction hole 31b is connected to an air filter 35 provided with its one side opened to the atmosphere to prevent dusts from entering from the outside, so as to communicate with the other side of the air filter 35.

The vapor solenoid valve 32 is provided with a canister connection port 32a that is connected to the evaporative emission circulation hole 31a of the canister 31 so as to communicate therewith. In addition, the vapor solenoid valve 32 includes a vapor piping connection port 32b to which the vapor piping 38, whose one end is connected to the leveling valve 27 of the fuel tank 21 so as to communicate therewith, is connected so that the other end of the vapor piping 38 communicates with the vapor piping connection port 32b, and a purge piping connection port 32c to which the purge piping 39, whose one end is connected to the air intake passage 11 of the engine 10 so as to communicate therewith, is connected so that the other end of the purge piping 39 communicates with the purge piping connection port 32c. The vapor piping connection port 32b and the purge piping connection port 32c of the vapor solenoid valve 32 are connected to the vapor piping 38 and the purge piping 39, respectively. The vapor solenoid valve 32 is an electromagnetic valve of a normally closed type, which is closed in a nonenergized state and becomes a valve-open state by being energized with a driving signal supplied from the outside. When the vapor solenoid valve 32 is in a valve-open state by being energized with a driving signal supplied from the outside, the canister connection port 32a, the vapor piping connection port 32b, and the purge piping connection port 32c communicate with each other to enable an inflow and an outflow of a fuel evaporative emission to the canister 31 and an inflow of the air sucked from the air filter 35 to the vapor piping 38 and the purge piping 39. In addition, when the vapor solenoid valve 32 is in a valve-closed state in a nonenergized state, the canister connection port 32a is blocked to allow only the vapor piping connection port 32b and the purge piping connection port 32c to communicate with each other to disable an inflow and an outflow of a fuel evaporative emission to the canister 31 and an inflow of the air sucked from the air filter 35 to the vapor piping 38 and the purge piping 39. Thus, the vapor solenoid valve 32 blocks the canister 31 if in a valve-closed state, and opens the canister 31 if in a valve-open state.

The tank blocking valve 33 is provided in the vapor piping 38 between the leveling valve 27 arranged in the fuel tank 21, and the canister 31. The tank blocking valve 33 is an electromagnetic valve of a normally closed type, which is closed in a nonenergized state and becomes a valve-open state by being energized with a driving signal supplied from the outside. The tank blocking valve 33 blocks the vapor piping 38 when in a valve-closed state in a nonenergized state, and opens the vapor piping 38 when in a valve-open state by being energized with a driving signal supplied from the outside. Thus, the tank blocking valve 33 blocks the fuel tank 21 in a closed state if in a valve-closed state to disable an outflow of a fuel evaporative emission occurring in the fuel tank 21 to the outside of the fuel tank 21, and the tank blocking valve 33 enables an inflow of the fuel evaporative emission to the canister 31 if in a valve-open state.

The safety valve 34 is provided in the vapor piping 38 in parallel to the tank blocking valve 33, and if internal pressure of the fuel tank 21 rises, the safety valve 34 is opened to release the pressure to the canister 31, thereby preventing the fuel tank 2 from bursting.

The purge solenoid valve 37 is provided in the purge piping 39 between the air intake passage 11 of the engine 10, and the vapor solenoid valve 32. The purge solenoid valve 37 is an electromagnetic valve of a normally closed type, which is closed in a nonenergized state and becomes a valve-open state by being energized with a driving signal supplied from the outside. In addition, the purge solenoid valve 37 blocks the purge piping 39 if in a valve-closed state in a nonenergized state, and opens the purge piping 39 if in a valve-open state being energized with a driving signal supplied from the outside. Thus, the purge solenoid valve 37 disables an outflow of a fuel evaporative emission from the fuel evaporative emission treatment unit 30 to the engine 10 if in a valve-closed state, and enables an outflow of the fuel evaporative emission to the engine 10 if in a valve-open state.

The second pressure sensor 40 has a property capable of detecting pressure in a wide pressure range with a low accuracy (a measurement range of ±100 kPa, and a measurement accuracy of ±5 kPa, for example) with respect to the property of the first pressure sensor 25. The second pressure sensor 40 should have resolution capable of satisfying determination in steps S24 and S30 in meter indication control that will be described later. The second pressure sensor 40 is provided in the vapor piping 38 between the fuel tank 21 and the tank blocking valve 33 to detect internal pressure (absolute pressure) of the fuel tank 21 through the vapor piping 38.

The atmospheric pressure sensor 41 has a property capable of detecting pressure in a wide pressure range with a low accuracy with respect to the property of the first pressure sensor 25. The atmospheric pressure sensor 41, similar to the second pressure sensor 40, should have resolution capable of satisfying determination in steps S24 and S30 in the meter indication control that will be described later, and the atmospheric pressure sensor 41 is provided at a position capable of detecting the atmospheric pressure to detect the atmospheric pressure.

The filler lid actuator 62 fixes the filler lid 23 closed so that the filler lid 23 is not opened, and releases fixing of the filler lid 23 on the basis of a signal from an engine control unit 50 to enable the filler lid 23 to be opened. Thus, under usual conditions, the filler lid 23 is opened when fixing by the filler lid actuator 62 is released on the basis of a signal supplied from the engine control unit 50, and under unusual conditions, it is possible to open the filler lid 23 by allowing a driver and the like to mechanically operate the filler lid actuator 62 to release fixing of the filler lid 23 by the filler lid actuator 62. In addition, the filler lid actuator 62 is provided with a sensor for detecting opening/closing of the filler lid 23.

A display 63 indicates a vehicle state, such as a state from an operation of a filler lid switch 61 until the filler lid 23 is opened, that is, indicates a meter as shown in FIGS. 3 to 9, in which a progress degree of pressure release in the fuel tank 21, representing a progress degree of pressure reduction in the fuel tank 21 from a start of releasing internal pressure of the fuel tank 21 to a finish thereof, is indicated stepwise, or indicates a stop of an opening operation of the filler lid 23, and the like.

The engine control unit 50 is a control device for performing overall control of a vehicle. The engine control unit 50 includes an input-output device, a storage device (ROM, RAM, nonvolatile RAM, and the like), a central processing unit (CPU), a timer, and the like.

As shown in FIG. 2, on an input side of the engine control unit 50, there are connected the intake pressure sensor 14, the first pressure sensor 25, the second pressure sensor 40, the atmospheric pressure sensor 41, the filler lid switch 61 for opening and closing the filler lid 23 provided in a vehicle, and the filler lid actuator 62 for detecting opening/closing of the filler lid 23, described above, whereby detection information from these sensors is inputted into the engine control unit 50.

On the other hand, on an output side of the engine control unit 50, there are connected the fuel injection valve 12, the fuel pump 24, the vapor solenoid valve 32, the tank blocking valve 33, the purge solenoid valve 37, the filler lid actuator 62, and the display 63, described above.

The engine control unit 50 includes a filling starting part 51, a pressure reduction control part 52, a filling permission part 53, an abnormality detection part 54, and an indication part 55.

When a driver operates the filler lid switch 61, the filling starting part 51 supplies a filling start signal to the pressure reduction control part 52 to allow the fuel tank 21 to be in a filling available state, that is, pressure in the fuel tank 21 is reduced to set internal pressure of the fuel tank 21 at a fifth predetermined pressure (corresponding to a predetermined pressure of the present invention) or less.

When the filling start signal is supplied from the filling starting part 51, the pressure reduction control part 52 allows the tank blocking valve 33 to be opened so that internal pressure of the fuel tank 21 becomes the fifth predetermined pressure or less.

When the internal pressure of the fuel tank 21 becomes the fifth predetermined pressure or less, the filling permission part 53 supplies a filler lid actuator operation signal to the filler lid actuator 62 to allow the filler lid actuator 62 to operate so as to open the filler lid 23.

The abnormality detection part 54 detects abnormality of a fuel tank system such as the first pressure sensor 25 and the second pressure sensor 40. When abnormality is detected in any one of the first pressure sensor 25 and the second pressure sensor 40, or in both of the first pressure sensor 25 and the second pressure sensor 40, for example, the abnormality detection part 54 supplies the detection result to the indication part 55.

The indication part 55 controls an operation of the display 63 so that the display 63 indicates a state from an operation of a filler lid switch 61 until the filler lid 23 is opened, that is, a progress degree of pressure release in the fuel tank 21, representing a progress degree of pressure reduction in the fuel tank 21 from a start of releasing internal pressure of the fuel tank 21 to a finish thereof, or indicates a stop of an opening operation of the filler lid 23, and the like.

The engine control unit 50, on the basis of detection information from various sensors, controls the following: an operation of the filler lid 23; opening/closing of each of the vapor solenoid valve 32, the tank blocking valve 33, and the purge solenoid valve 37; pressure in the fuel tank 21, and in the vapor piping 38 and the purge piping 39, provided between the tank blocking valve 33 and the purge solenoid valve 37; and a flow of a fuel evaporative emission such as absorption of a fuel evaporative emission into the canister 31, and an outflow of the fuel evaporative emission absorbed into the canister 31 to the air intake passage 11 of the engine 10. Particularly, when the engine 10 is stopped, the engine control unit 50 closes the tank blocking valve 33 to allow the fuel tank 21 to be in a closed state, and when a driver operates the filler lid switch 61 for filling a vehicle or the like, the engine control unit 50 opens the tank blocking valve 33 to release internal pressure of the fuel tank 21 so that a fuel evaporative emission in the fuel tank 21 is guided into the canister 31. When the internal pressure of the fuel tank 21 becomes equivalent to the atmospheric pressure, that is, the first tank internal pressure P1 becomes the fifth predetermined pressure (0.5 kPa, for example), fixing of the filler lid 23 by the filler lid actuator 62 is released to open the filler lid 23. When a driver operates the filler lid switch 61 for filling or the like to open the tank blocking valve 33, the engine control unit 50 performs meter indication control for allowing the display 63 to perform meter indication on the basis of detection results obtained by the first pressure sensor 25, the second pressure sensor 40, and the atmospheric pressure sensor 41 so that the driver can visually check a progress degree of pressure release in the fuel tank 21, representing a progress degree of pressure reduction in the fuel tank 21 from a start of releasing internal pressure of the fuel tank 21 to a finish thereof, from the internal pressure of the fuel tank 21. In addition, the engine control unit 50 calculates a second tank internal pressure (corresponding to pressure in a fuel tank of the present invention) P2, which is an internal pressure of the fuel tank 21, by subtracting the atmospheric pressure detected by the atmospheric pressure sensor 41 from internal pressure of the fuel tank 21 detected by the second pressure sensor 40.

Hereinafter, meter indication control in the engine control unit 50 of the fuel tank system in accordance with the present invention, configured as above, will be described.

FIGS. 10 and 11 each show a flow chart of meter indication control of the fuel tank system in accordance with the present invention.

As shown in FIGS. 10 and 11, in a step S10, it is determined whether the filler lid switch 61 is turned on, that is, the filler lid switch 61 is operated. If the determination result is true (Yes), and the filler lid switch 61 has been turned on, that is, the filler lid switch 61 has been operated, processing proceeds to a step S12. If the determination result is nay (No), and the filler lid switch 61 has not been turned on, and the filler lid switch 61 has not been operated, the step S10 is performed again. Thus, the operation control of the filler lid is started by the operation of the filler lid switch 61 as a trigger. If the filler lid switch 61 is operated, the tank blocking valve 33 is opened to release internal pressure of the fuel tank 21.

Figure 3:
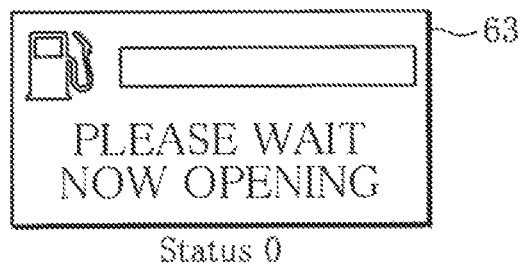
FIG. 3 shows an indication content at a Status 0 of an indication state of a meter indicated on a display.

In the step S12, a meter of Status 0 of FIG. 3 is indicated on the display 63, and processing proceeds to a step S14, that is, to start indication of a progress degree of pressure release in the fuel tank 21.

In the step S14, count of pressure release indication start time is started, and processing proceeds to a step S16.

In the step S16, it is determined whether indication time of the meter of Status 0 is equal to or more than a first predetermined time (corresponding to a predetermined period of the present invention) (0.5 sec., for example). Particularly, it is determined whether the first predetermined time or more has elapsed after indication of the meter of Status 0 on the display 63 was started. If the determination result is true (Yes), and the first predetermined time or more has elapsed after the indication of the meter of Status 0 on the display 63 was started, processing proceeds to a step S18. If the determination result is nay (No), and the first predetermined time or more has not elapsed after the indication of the meter of Status 0 on the display 63 was started, the processing of the step S16 is performed again.

In the step S18, it is determined whether there is abnormality in the second pressure sensor 40 or in the atmospheric pressure sensor 41. If the determination result is true (Yes), and there is abnormality in the second pressure sensor 40 or in the atmospheric pressure sensor 41, or in both the second pressure sensor 40 and the atmospheric pressure sensor 41, processing proceeds to a step S32. If the determination result is nay (No), and there is no abnormality in any of the second pressure sensor 40 and the atmospheric pressure sensor 41, the processing proceeds to a step S20. Thus, in the step 18, in a case where there is abnormality in the second pressure sensor 40 or in the atmospheric pressure sensor 41, there is a possibility that a detection value obtained by the second pressure sensor 40 or the atmospheric pressure sensor 41 may show an abnormal value and may perform abnormal meter indication on the display 63, whereby meter indication on the display 63 by using a detection value obtained by the second pressure sensor 40 and the atmospheric pressure sensor 41 to be started after the step 18 is omitted.

Figure 4:
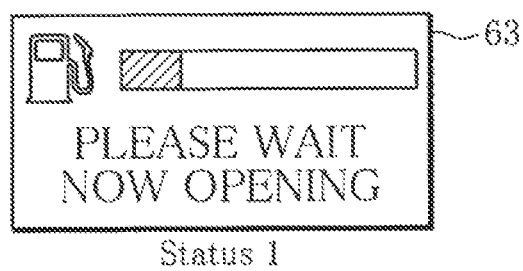
FIG. 4 shows an indication content at a Status 1 of an indication state of a meter indicated on a display.

In the step S20, a meter of Status 1 of FIG. 4 is indicated on the display 63, and processing proceeds to a step S22.

In the step S22, it is determined whether indication time of the meter of Status 1 is equal to or more than the first predetermined time (0.5 sec., for example). Particularly, it is determined whether the first predetermined time or more has elapsed after indication of the meter of Status 1 on the display 63 was started. If the determination result is true (Yes), and the first predetermined time or more has elapsed after the indication of the meter of Status 1 on the display 63 was started, processing proceeds to a step S24. If the determination result is nay (No), and the first predetermined time or more has not elapsed after the indication of the meter of Status 1 on the display 63 was started, the processing of the step S22 is performed again.

In the step S24, it is determined whether the second tank internal pressure P2 is equal to or less than a first predetermined pressure (25 kPa, for example). Particularly, it is determined whether the second tank internal pressure P2 calculated by subtracting the atmospheric pressure detected by the atmospheric pressure sensor 41 from internal pressure (absolute pressure) of the fuel tank 21 detected by the second pressure sensor 40 is equal to or less than the first predetermined pressure. If the determination result is true (Yes), and the second tank internal pressure P2 is equal to or less than the first predetermined pressure, processing proceeds to a step S26. If the determination result is nay (No), and the second tank internal pressure P2 is not equal to or less than the first predetermined pressure, the processing of the step S24 is performed again.

Figure 5:
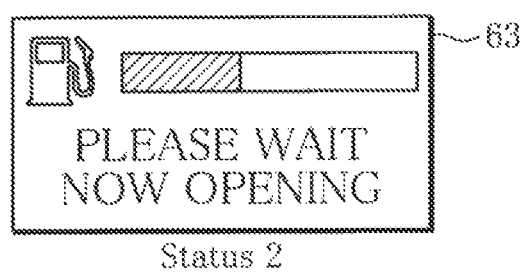
FIG. 5 shows an indication content at a Status 2 of an indication state of a meter indicated on a display.

In the step S26, a meter of Status 2 of FIG. 5 is indicated on the display 63, and processing proceeds to a step S28.

In the step S28, it is determined whether indication time of the meter of Status 2 is equal to or more than the first predetermined time (0.5 sec., for example). Particularly, it is determined whether the first predetermined time or more has elapsed after indication of the meter of Status 2 on the display 63 was started. If the determination result is true (Yes), and the first predetermined time or more has elapsed after the indication of the meter of Status 2 on the display 63 was started, processing proceeds to a step S30. If the determination result is nay (No), and the first predetermined time or more has not elapsed after the indication of the meter of Status 2 on the display 63 was started, the processing of the step S28 is performed again.

In the step S30, it is determined whether the second tank internal pressure P2 is equal to or less than a second predetermined pressure (15 kPa, for example). If the determination result is true (Yes), and the second tank internal pressure P2 is equal to or less than the second predetermined pressure, processing proceeds to a step S32. If the determination result is nay (No), and the second tank internal pressure P2 is not equal to or less than the second predetermined pressure, the processing of the step S30 is performed again. The steps S10 to S30 correspond to a former stage of a progress degree of pressure release in a fuel tank of the invention of the present application.

In the step S32, it is determined whether there is abnormality in the first pressure sensor 25. If the determination result is true (Yes), and there is abnormality in the first pressure sensor 25, this routine is returned. If the determination result is nay (No), and there is no abnormality in the first pressure sensor 25, processing proceeds to a step S34. Thus, in the step S32, in a case where there is abnormality in the first pressure sensor 25, there is a possibility that a detection value obtained by the first pressure sensor 25 may show an abnormal value and may perform abnormal meter indication on the display 63, whereby meter indication on the display 63 by using a detection value obtained by the first pressure sensor 25 to be started after the step 32 is omitted.

Figure 6:
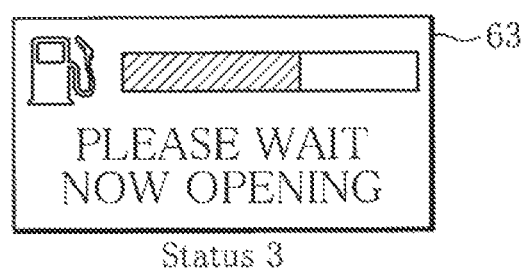
FIG. 6 shows an indication content at a Status 3 of an indication state of a meter indicated on a display.

In the step S34, a meter of Status 3 of FIG. 6 is indicated on the display 63, and processing proceeds to a step S36.

In the step S36, it is determined whether indication time of the meter of Status 3 is equal to or more than the first predetermined time (0.5 sec., for example). Particularly, it is determined whether the first predetermined time or more has elapsed after indication of the meter of Status 3 on the display 63 was started. If the determination result is true (Yes), and the first predetermined time or more has elapsed after the indication of the meter of Status 3 on the display 63 was started, processing proceeds to a step S38. If the determination result is nay (No), and the first predetermined time or more has not elapsed after the indication of the meter of Status 3 on the display 63 was started, the processing of the step S36 is performed again.

In the step S38, it is determined whether the first tank internal pressure P1 is equal to or less than a third predetermined pressure (6 kPa, for example). Particularly, it is determined whether the first tank internal pressure P1, which is the internal pressure of the fuel tank 21 detected by the first pressure sensor 25, is equal to or less than the third predetermined pressure. If the determination result is true (Yes), and the first tank internal pressure P1 is equal to or less than the third predetermined pressure, processing proceeds to a step S40. If the determination result is nay (No), and the first tank internal pressure P1 is not equal to or less than the third predetermined pressure, the processing of the step S38 is performed again.

Figure 7:
FIG. 7 shows an indication content at a Status 4 of an indication state of a meter indicated on a display.

In the step S40, a meter of Status 4 of FIG. 7 is indicated on the display 63, and processing proceeds to a step S42.

In the step S42, it is determined whether indication time of the meter of Status 4 is equal to or more than the first predetermined time (0.5 sec., for example). Particularly, it is determined whether the first predetermined time or more has elapsed after indication of the meter of Status 4 on the display 63 was started. If the determination result is true (Yes), and the first predetermined time or more has elapsed after the indication of the meter of Status 4 on the display 63 was started, processing proceeds to a step S44. If the determination result is nay (No), and the first predetermined time or more has not elapsed after the indication of the meter of Status 4 on the display 63 was started, the processing of the step S42 is performed again.

In the step S44, it is determined whether the first tank internal pressure P1 is equal to or less than a fourth predetermined pressure (3 kPa, for example). If the determination result is true (Yes), and the first tank internal pressure P1 is equal to or less than the fourth predetermined pressure, processing proceeds to a step S46. If the determination result is nay (No), and the first tank internal pressure P1 is not equal to or less than the fourth predetermined pressure, the processing of the step S44 is performed again.

Figure 8:
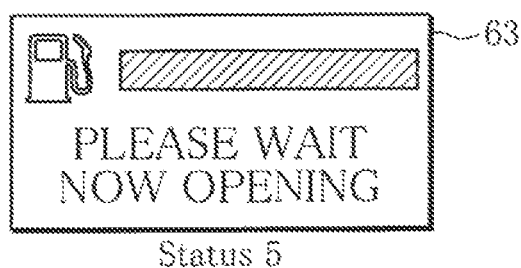
FIG. 8 shows an indication content at a Status 5 of an indication state of a meter indicated on a display.

In the step S46, a meter of Status 5 of FIG. 8 is indicated on the display 63, and processing proceeds to a step S48.

In the step S48, it is determined whether indication time of the meter of Status 5 is equal to or more than the first predetermined time (0.5 sec., for example). Particularly, it is determined whether the first predetermined time or more has elapsed after indication of the meter of Status 5 on the display 63 was started. If the determination result is true (Yes), and the first predetermined time or more has elapsed after the indication of the meter of Status 5 on the display 63 was started, processing proceeds to a step S50. If the determination result is nay (No), and the first predetermined time or more has not elapsed after the indication of the meter of Status 5 on the display 63 was started, the processing of the step S48 is performed again.

In the step S50, it is determined whether the first tank internal pressure P1 is equal to or less than a fifth predetermined pressure (corresponding to a predetermined pressure of the present invention) (0.5 kPa, for example). If the determination result is true (Yes), and the first tank internal pressure P1 is equal to or less than the fifth predetermined pressure, processing proceeds to a step S52. If the determination result is nay (No), and the first tank internal pressure P1 is not equal to or less than the fifth predetermined pressure, the processing of the step S50 is performed again.

In the step S52, it is determined whether pressure release indication time is equal to or more than a second predetermined time (4 sec., for example). If the determination result is true (Yes), and the elapsed pressure release indication time is equal to or more than the second predetermined time, processing proceeds to a step S54. If the determination result is nay (No), and the elapsed pressure release indication time is less than the second predetermined time, the processing of the step S52 is performed again.

Figure 9:
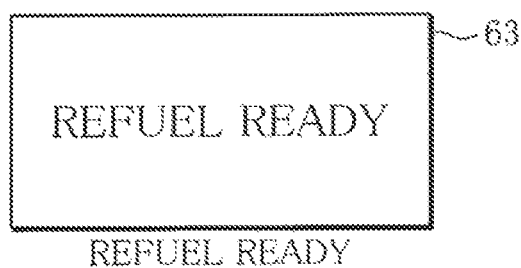
FIG. 9 shows an indication content at a REFUEL READY of an indication state of a meter indicated in a display.

In the step S54, an indication of REFUEL READY of FIG. 9 is indicated on the display 63, and this routine is returned. When the step S54 is performed, fixing of the filler lid 23 by the filler lid actuator 62 is released to open the filler lid 23. The steps S32 to S54 correspond to a latter stage of a progress degree of pressure release in a fuel tank of the invention of the present application.

As above, in a fuel tank system in accordance with the present invention, internal pressure of the fuel tank 21 is detected by using: the first pressure sensor 25 provided in the fuel tank, capable of detecting pressure in a narrow pressure range with a high accuracy; the second pressure sensor 40 provided in the vapor piping 38 between the fuel tank 21 and the tank blocking valve 33, capable of detecting pressure in a wide pressure range with a low accuracy with respect to the first pressure sensor 25; and the atmospheric pressure sensor 41. Until internal pressure of the fuel tank 21 becomes the second predetermined pressure, meter indication for showing a period until the filler lid 23 is opened is performed on the basis of the second tank internal pressure P2 calculated by subtracting the atmospheric pressure detected by the atmospheric pressure sensor 41 from the internal pressure (absolute pressure) of the fuel tank 21 detected by the second pressure sensor 40. When the internal pressure of the fuel tank 21 becomes less than the second predetermined pressure, meter indication for showing a period until the filler lid 23 is opened is performed on the basis of the first tank internal pressure P1, which is the internal pressure of the fuel tank 21 detected by the first pressure sensor 25, until the internal pressure of the fuel tank 21 becomes the fifth predetermined pressure.

Thus, in combination with two detection results of a detection result obtained by the first pressure sensor 25 and a detection result obtained by the second pressure sensor 40 and the atmospheric pressure sensor 41, a progress degree of pressure release from a start of releasing pressure in the fuel tank 21 to a finish thereof when internal pressure of the fuel tank 21 is released at the time of filling a vehicle is indicated on the display 63 as meter indication. As a result, even in a case where fuel in the fuel tank 21 becomes a high temperature and causes a large amount of evaporation of the fuel, so that internal pressure of the fuel tank 21 hardly decreases, for example, it is possible to accurately notify a driver of a progress degree of pressure release in the fuel tank 21 to prevent giving the driver discomfort such as that the filler lid 23 is not opened even if the indication of REFUEL READY of FIG. 9 is indicated on the display 63.

In addition, it is possible to accurately detect pressure in the fuel tank 21 in a range from a high pressure to a low pressure by properly using a detection result obtained by the first pressure sensor 25 or a detection result obtained by the second pressure sensor 40 and the atmospheric pressure sensor 41 in a former stage and a latter stage of a progress degree of pressure release in the fuel tank 21.

Further, if abnormality is detected in any one of the first pressure sensor 25, the second pressure sensor 40, and the atmospheric pressure sensor 41, or in all of the first pressure sensor 25, the second pressure sensor 40, and the atmospheric pressure sensor 41, it is possible to enable a driver to recognize the abnormality of the pressure sensor by finishing meter indication on the display 63, corresponding to a pressure sensor in which the abnormality is detected, that is, by finishing indication of the progress degree of pressure release.

In a case where the internal pressure of the fuel tank 21 is high in a former stage of a progress degree of pressure release from a start of releasing pressure in the fuel tank 21 to a finish thereof until the internal pressure of the fuel tank 21 becomes the second predetermined pressure, the filler lid 23 is not opened. As a result, since the internal pressure of the fuel tank 21 is calculated by using the second pressure sensor 40 capable of detecting pressure in a wide pressure range with a low accuracy and the atmospheric pressure sensor 41, it is unnecessary to use an expensive pressure sensor capable of detecting pressure in a wide pressure range with a high accuracy, whereby an increase in cost can be prevented.

In addition, the first pressure sensor 25 is provided in an upper portion of the fuel tank 21 and the second pressure sensor 40 is provided in the vapor piping 38, so that it is possible to accurately detect pressure in the fuel tank 21 by arranging each of the sensors close to the fuel tank 21.

Further, a progress degree of pressure release from a start of releasing pressure in the fuel tank 21 to a finish thereof is divided into a plurality of stages in accordance with internal pressure of the fuel tank 21, and meter indication is performed on the display 63 in accordance with the divided stages of the internal pressure of the fuel tank 21. Accordingly, it is possible to visually indicate a transition of pressure release in fuel tank 21 until finishing thereof by performing each meter indication corresponding to a progress degree of the pressure release for the first predetermined time or more, and by switching the meter indications on the display 63 in order.

The first pressure sensor 25 and the second pressure sensor 40, which are used for indicating a progress degree of pressure release in the fuel tank 21 representing a progress degree of pressure reduction in the fuel tank 21 from a start of releasing pressure in the fuel tank 21 to a finish thereof based on an operation of the filler lid switch 61 at the time of releasing internal pressure of the fuel tank 21 when the filling opening 22 of the fuel tank 21 is opened for filling a vehicle etc., are switched when the internal pressure of the fuel tank 21 becomes the second predetermined pressure, that is, each of the sensors is properly used in a former stage or a latter stage of a progress degree of pressure release in the fuel tank 21 from a start of releasing pressure to a finish thereof. As a result, if abnormality is detected in any one of the first pressure sensor 25 and the second pressure sensor 40, or in both of the first pressure sensor 25 and the second pressure sensor 40, for example, indication of a progress degree of pressure release in fuel tank 21 corresponding to the pressure sensor in which the abnormality is detected is stopped so that meter indication is not performed on the display 63 or is stopped in the middle of the indication, whereby the meter indication on the display 63 enables a driver to recognize the abnormality of the first pressure sensor 25 and the second pressure sensor 40.

What is claimed is:

1. A fuel tank system comprising:
a fuel tank mounted on a vehicle;
a canister that absorbs a fuel evaporative emission released from the fuel tank;
piping that connects the canister and the fuel tank;
a blocking valve that is provided in the piping to block the fuel tank;
a filling starting part that instructs a start of filling to the fuel tank;
a first pressure detector arranged in the fuel tank to detect pressure in the fuel tank;
a second pressure detector that detects the pressure in the fuel tank with an accuracy different from an accuracy of the first pressure detector;
a pressure reduction control part that reduces the pressure in the fuel tank to a predetermined pressure by opening the blocking valve when a start of filling is instructed by the filling starting part;
a filling permission part that permits filling when the pressure in the fuel tank becomes the predetermined pressure or less with the pressure reduction control part; and
an indication part that indicates a progress degree of reduction of the pressure in the fuel tank on the basis of a detection result obtained by the second pressure detector in a former stage of a progress degree of the reduction of the pressure during a period from the instruction of the start of filling to the permission of filling, and indicates a progress degree of reduction of the pressure in the fuel tank on the basis of a detection result obtained by the first pressure detector in a latter stage of a progress degree of the reduction of the pressure during the period from the instruction of the start of filling to the permission of filling.

2. The fuel tank system according to claim 1, wherein the first pressure detector detects pressure in a narrow pressure range with a high accuracy, and the second pressure detector detects pressure in a wider pressure range with a lower accuracy than the first pressure detector.

3. The fuel tank system according to claim 2, wherein the indication part has a display for indicating a progress degree of the pressure reduction by dividing the progress degree into a plurality of stages, and maintains an indication corresponding to each of the stages of the progress degree of the pressure reduction in the fuel tank on the display at least during a predetermined period.

4. The fuel tank system according to claim 2, further comprising:
an abnormality detection part that detects abnormality in the fuel tank system, wherein the indication part stops the indication in a case where the abnormality detection part detects abnormality.

5. The fuel tank system according to claim 2, wherein the first pressure detector is provided in an upper portion of the fuel tank, and the second pressure detector is provided in the piping.

6. The fuel tank system according to claim 1, wherein the indication part has a display for indicating a progress degree of the pressure reduction by dividing the progress degree into a plurality of stages, and maintains an indication corresponding to each of the stages of the progress degree of the pressure reduction in the fuel tank on the display at least during a predetermined period.

7. The fuel tank system according to claim 1, further comprising:
an abnormality detection part that detects abnormality in the fuel tank system, wherein the indication part stops the indication in a case where the abnormality detection part detects abnormality.

8. The fuel tank system according to claim 1, wherein the first pressure detector is provided in an upper portion of the fuel tank, and the second pressure detector is provided in the piping.

* * * * *